(12) United States Patent
Toriyama et al.

(10) Patent No.: US 8,009,244 B2
(45) Date of Patent: Aug. 30, 2011

(54) LIQUID CRYSTAL DISPLAY DEVICE HAVING SPACERS DISPOSED BETWEEN AN EDGE LIT OPTICAL GUIDE AND LIGHT-EMITTING ELEMENTS

(75) Inventors: Yoshio Toriyama, Nagara (JP); Norihisa Fukayama, Mobara (JP); Saburo Watanabe, Ichinomiya (JP)

(73) Assignee: Hitachi Displays, Ltd., Chiba (JP)

( * ) Notice: Subject to any disclaimer, the term of this patent is extended or adjusted under 35 U.S.C. 154(b) by 237 days.

(21) Appl. No.: 11/865,742

(22) Filed: Oct. 2, 2007

(65) Prior Publication Data
US 2008/0088763 A1    Apr. 17, 2008

(30) Foreign Application Priority Data
Oct. 2, 2006   (JP) .................................. 2006-270326

(51) Int. Cl.
*G02F 1/1335*   (2006.01)
*G02F 1/1333*   (2006.01)
*G09F 13/08*    (2006.01)

(52) U.S. Cl. ............................. 349/65; 349/58; 362/97.3

(58) Field of Classification Search .................... 349/65, 349/58, 61; 362/97.2–97.4
See application file for complete search history.

(56) References Cited

U.S. PATENT DOCUMENTS

| | | | |
|---|---|---|---|
| 2005/0270794 A1* | 12/2005 | Okamoto et al. | 362/555 |
| 2006/0044489 A1* | 3/2006 | Uchizono | 349/58 |
| 2006/0077321 A1* | 4/2006 | Ukawa | 349/113 |
| 2006/0152931 A1* | 7/2006 | Holman | 362/297 |
| 2006/0256254 A1* | 11/2006 | Park et al. | 349/65 |
| 2007/0097284 A1* | 5/2007 | Ho et al. | 349/58 |

FOREIGN PATENT DOCUMENTS

| | | |
|---|---|---|
| JP | 64-088426 | 4/1989 |
| JP | 2002-162626 | 6/2002 |
| JP | 2002162626 A * | 6/2002 |

* cited by examiner

*Primary Examiner* — David Nelms
*Assistant Examiner* — Paul C Lee
(74) *Attorney, Agent, or Firm* — Antonelli, Terry, Stout & Kraus, LLP.

(57) ABSTRACT

Plural light-emitting diodes are disposed in an on-line arrangement on a surface a circuit board facing an optical guide and spacers having a projecting dimension larger than the projecting dimension of this light-emitting diode from the surface are disposed adjacent to the light-emitting diode on the surface of the circuit board.

12 Claims, 9 Drawing Sheets

LIQUID CRYSTAL DISPLAY DEVICE HAVING SPACERS DISPOSED BETWEEN AN EDGE LIT OPTICAL GUIDE AND LIGHT-EMITTING ELEMENTS

CLAIM OF PRIORITY

The present application claims priority from Japanese Application JP 2006-270326 filed on Oct. 2, 2006, the content of which is hereby incorporated by reference into this application.

BACKGROUND OF THE INVENTION (1) Field of the Invention

The present invention relates to an optical source for a non-self luminous display device, and more particularly to a liquid crystal display device having a backlight used as an optical source for light-emitting elements which are light-emitting diodes.

(2) Description of the Related Art

In recent years, many types of liquid crystal display devices have come into use as display devices. Liquid crystal display devices are used, for example, in TV receivers and portable instruments on account of their thinness, lightweightness and energy-saving advantages.

Since these liquid crystal display devices are not self luminous, they require some means of illumination. The illumination device generally used for liquid crystal display devices is a planar illumination device known as a backlight. In the prior art, the light-emitting source for this backlight has conventionally been a cold cathode discharge lamp. In recent years, many types of backlight for liquid crystal display devices have come into use, including those where the light-emitting source is a light-emitting element comprising a light-emitting diode (hereafter, LED).

As a liquid crystal display device using an LED as a light source, a configuration wherein plural LED are disposed in an in-line arrangement is proposed for example in Japanese Patent Application Laid-Open Publication No. S64-88426. Also, an edge-light configuration wherein LED are disposed facing the side surface of an optical guide, is disclosed in Japanese Patent Application Laid-Open Publication No. 2002-162626.

The edge-light type backlight is suitable for a liquid crystal display device having a low power consumption. In an edge-light type backlight having such a feature, since the LED and the optical guide are disposed close to each other in mutually opposite positions, when the liquid crystal display device was subjected to vibration or shock, cracks could appear in the solder part of the LED where the LED and optical guide are in contact, so that the LED might not light up. It was therefore desired to solve this problem from the viewpoint of maintaining the reliability of the liquid crystal display device and extending its life.

It is therefore an object of the present invention, which was conceived in view of the above problem, to provide a liquid crystal display device having an edge-type backlight and a highly reliable backlight which obviates the risk that the LED will fail to become illuminated, having a high display reliability, and having a long life.

SUMMARY OF THE INVENTION

In order to achieve this object, the liquid crystal display device of the present invention has an edge-light type of backlight, wherein spacers which prevent the LED from coming in contact with an optical guide are interposed between the LED of the light-emitting elements forming the backlight and the optical guide.

According to the invention, the LED can be prevented from coming in contact with the light-emitting elements and the optical guide, hence the failure of the LED to light up can be prevented, and a highly reliable, long life liquid crystal display device with a highly reliable backlight can be manufactured.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF THE PREFERRED EMBODIMENTS

Figure 1:
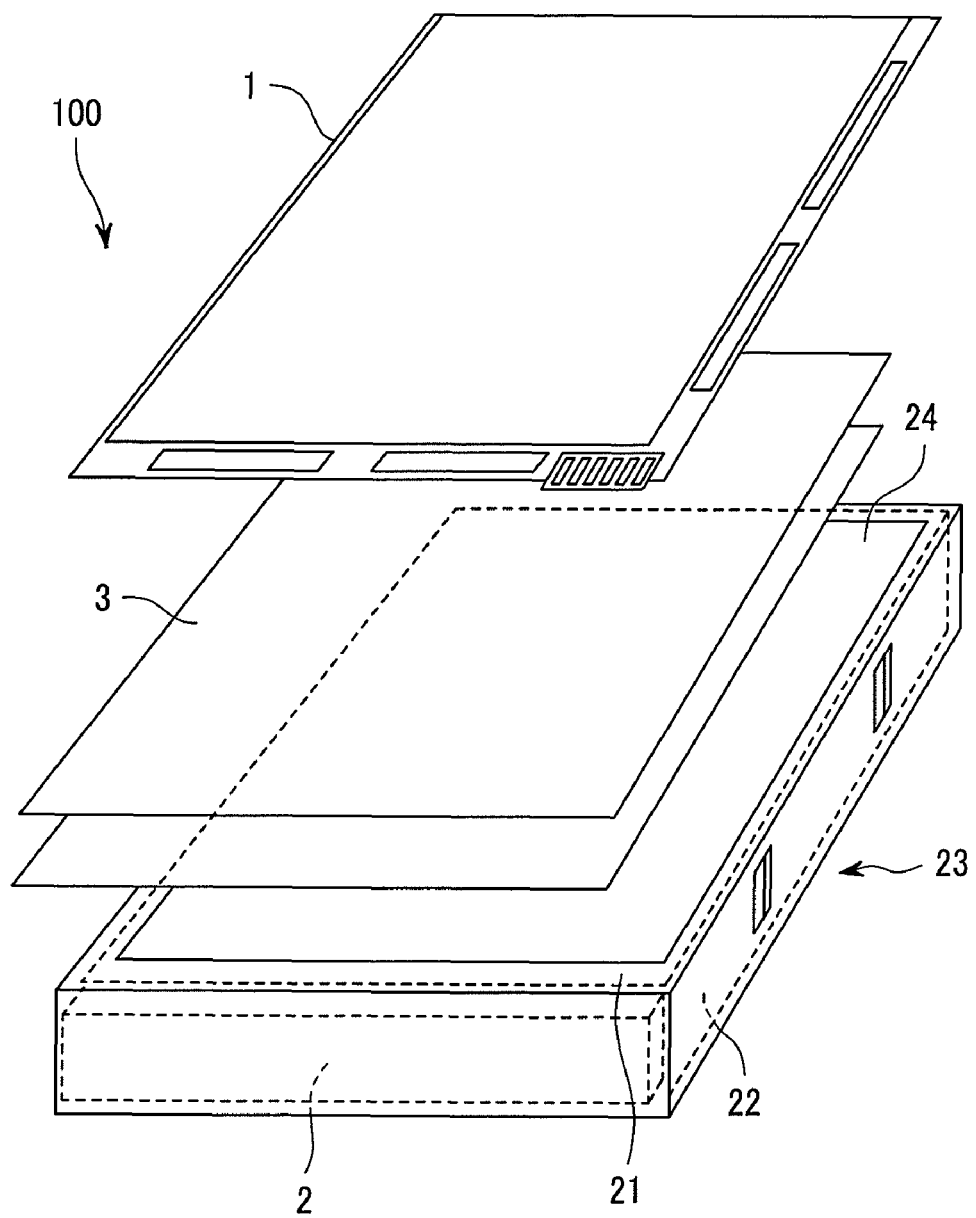
FIG. 1 is a schematic view showing the overall construction of one embodiment of the liquid crystal display device according to the present invention.

Hereafter, some specific aspects of the invention will be described in further detail referring to the drawings.

First Embodiment

FIG. 1 is a schematic view showing the essential features of the overall construction of one embodiment of the liquid crystal display device according to the present invention. In FIG. 1, a liquid crystal display device 100 includes a liquid crystal display panel 1, a backlight 2 which irradiates light to this liquid crystal display panel 1, and an optical sheet 3 disposed between this backlight 2 and the liquid crystal display panel 1. The liquid crystal display panel 1 is formed by sealing a liquid crystal layer between glass substrates having pixel-forming electrodes. A signal and a power supply voltage required for the liquid crystal display panel 1 to display an image are supplied to the liquid crystal display panel 1 from a control circuit. In the liquid crystal display panel 1, a transmission amount or reflection amount of light irradiated by the backlight 2 is controlled to display the image.

The details of the construction of the backlight 2 will be described later, but this backlight 2 is supported inside a case 23 formed of an upper case 21 and a lower case 22. Depressions are provided on the side surface of the upper case 21, projections are provided on the side surface of the lower case 22, and by the engaging of these projections with the depressions, the upper case 21 and lower case 22 are fixed together, the light source and the optical guide forming the backlight 2 being supported inside. The upper case 21 has a window 24 so that light emitted from the optical guide is irradiated onto the liquid crystal display panel 1.

The liquid crystal display panel 1 is mounted on the side of the window 24 which emits the light of this backlight 2. An optical sheet 3 disposed between the liquid crystal display panel 1 and backlight 2, is formed by sequentially laminating, for example, a dispersing sheet, first dispersing sheet, two prism sheets which intersect with each other, and a second dispersing sheet.

Figure 2:
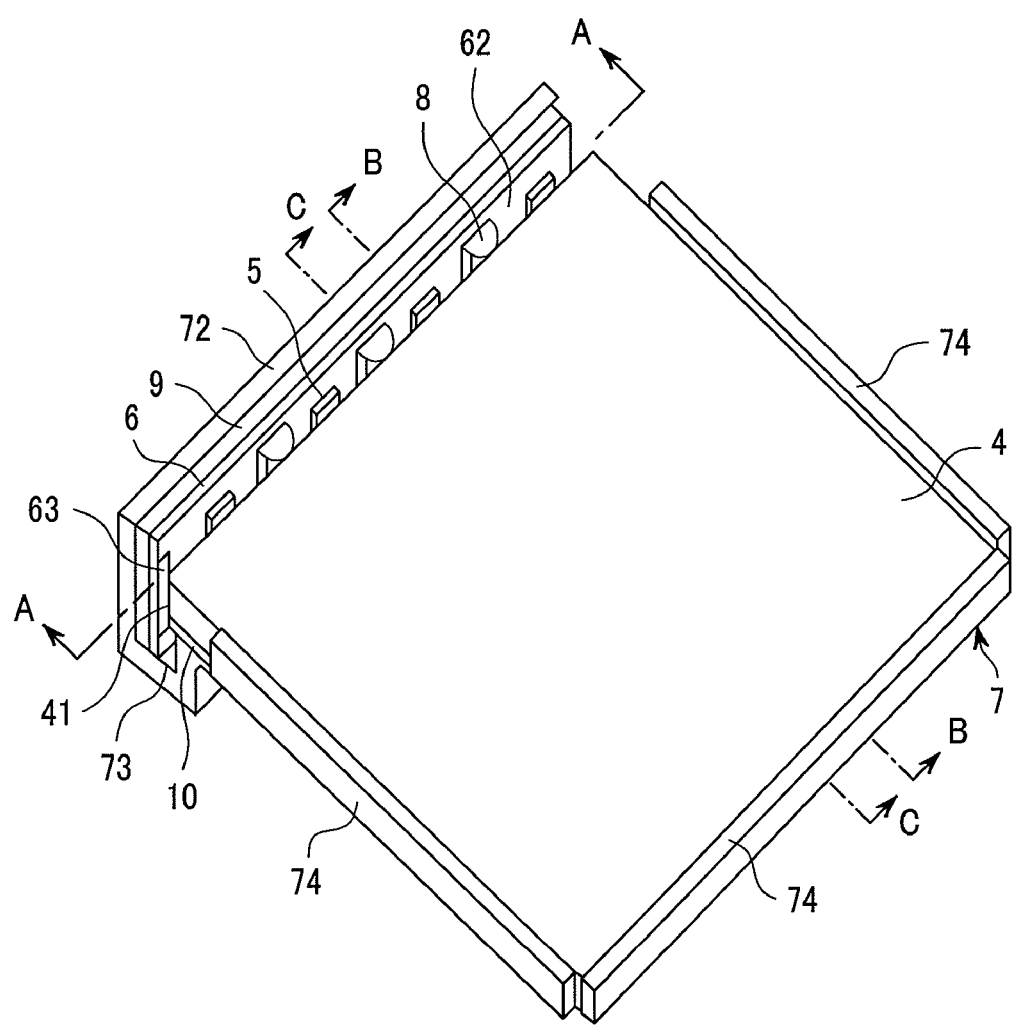
FIG. 2 is a perspective view of essential parts describing the construction of one embodiment of the backlight used in the liquid crystal display device according to the present invention.
Figure 3:
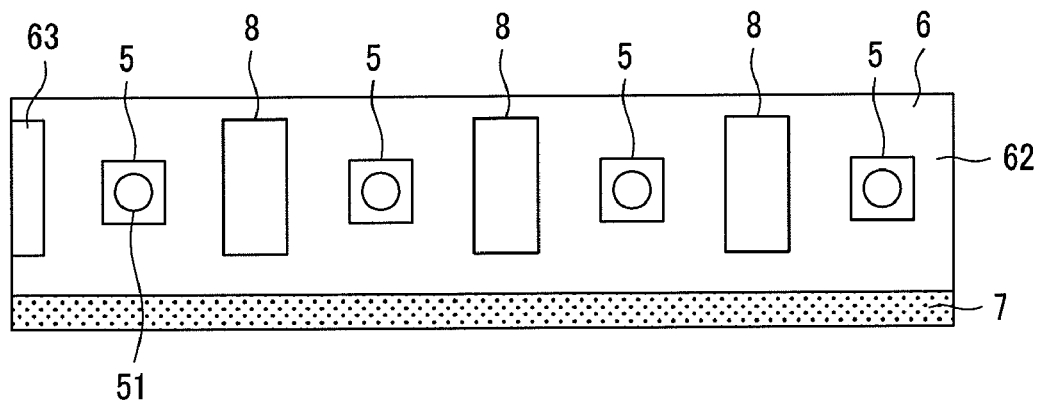
FIG. 3 is a schematic cross-sectional view taken along a line A-A in FIG. 2.
Figure 4:
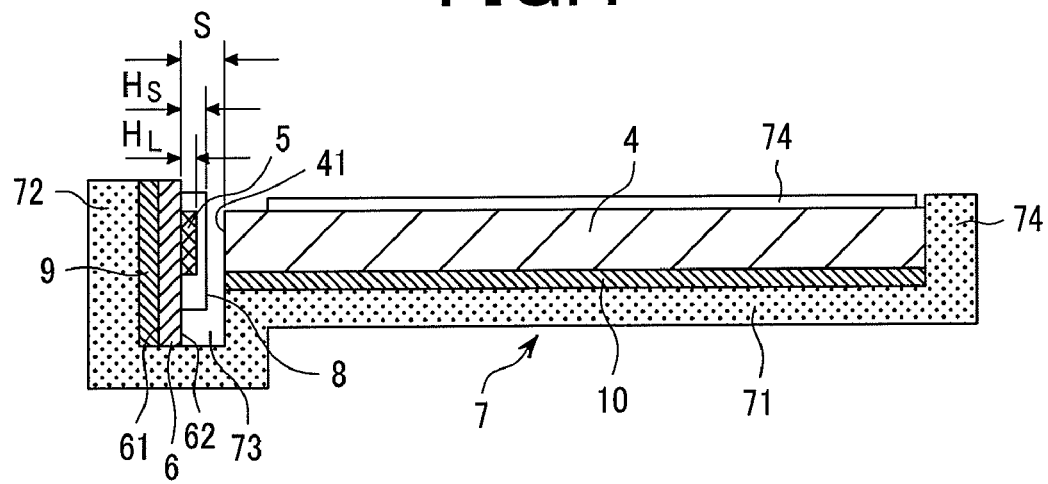
FIG. 4 is a schematic cross-sectional view taken along a line B-B in FIG. 2.

FIG. 2 to FIG. 4 are schematic views describing a typical construction of a backlight used in a liquid crystal display device according to the present invention. FIG. 2 is a perspective view of essential parts, FIG. 3 is a cross-sectional view taken along a line A-A in FIG. 2, and FIG. 4 is a cross-sectional view taken along a line B-B in FIG. 2, identical parts to those in FIG. 1 being assigned identical symbols.

In FIG. 2 to FIG. 4, 4 is an optical guide, 5 is an LED of a light-emitting element, 6 is a circuit board, 7 is a case, 8 is a spacer, 9 is a joining member, and 10 is a reflective sheet. When assembling the backlight 2, the plate-like optical guide 4 is first mounted and supported on a flat part 71 of the case 7 via the reflective sheet 10. This case 7, which corresponds to the lower case 22 and is formed for example from a metal plate, serves simultaneously as a housing for the backlight and a heat radiator.

The case 7 has a substantially u-shaped cross-section including the flat part 71 on which the optical guide 4 is mounted, a side wall 72 substantially perpendicular to this flat part 71, a depression 73 which is disposed between this side wall 72 and the flat part 71, and which is set back substantially parallel to the side wall 72 from the end face of one side of the flat part 71, and a support 74 substantially parallel to the side wall 72 from each end face of the remaining three sides of the flat part 71 supporting the optical guide 4.

The circuit board 6 is disposed in the depression 73 of the case 7, and after finalizing the positional relation between the optical guide 4 and plural LED 5, the circuit board 6 is fixed to the case side wall 72 by a joining member 9. Specifically, the circuit board 6 on which the plural LED 5 are supported in an in-line arrangement in the depression 73 of the case 7, is disposed such that the centers of the light-emitting ports 51 of the LED 5 coincide with and are facing the center of the thickness of the side surface 41 of the optical guide 4. A rear surface 61 of this circuit board 6 is fixed to the case side wall 72 by the joining member 9, for example a thermoconductive double-sided tape, and the positional relationship between the optical guide 4 and plural LED 5 is thus determined. It will of course be understood that when this positional relationship is determined, the remaining three surfaces apart from the one surface 41 of the optical guide 4 are supported and fixed by the support 74. The LED 5 are fixed by a means such as soldering on a surface 62 side of the circuit board 6, and are connected to an external circuit via a terminal 63.

Also, on the circuit board 6, rod-shaped spacers 8 are respectively disposed to extend substantially parallel to the side wall 72 between the LED 5 on the surface 62. These spacers 8, which are formed for example of a heat-resisting member such as polycarbonate, silicone rubber or the like, are stuck to the surface 62, and prevent the LED 5 from coming in contact with the side wall 41. The projecting dimensions of the spacers 8 from the surface 62 of the circuit board 6 are maintained to have the following relationship.

Specifically, if the gap between the surface 62 of the circuit board 6 and the side wall 41 of the optical guide 4 is S, the projecting dimensions of the LED 5 from the surface 62 are HL, and the projecting dimensions of the spacers 8 from the surface 62 are $H_S$, $S \geq H_S > H_L$. It is possible to arrange $S=H_S$ by suitably selecting the spacer material, but it is preferred that $S > H_S$.

The relation between $H_S$ and $H_L$ is, $H_S = H_L + \alpha$, where $\alpha$ is appropriately determined according to the spacer material.

Specifically, if $H_L = 0.8$ mm, for a plastic spacer, $H_S$ is set to be 0.9-1.0 mm. For a silicone rubber spacer, the condition $S > H_S \geq H_L$ can still be satisfied, and if $H_L = 0.8$ mm, Hs can be arranged to be approximately 0.8 to 0.9 mm.

In the above description, the spacers 8 were installed between all of the LED 5, but their positions and numbers may be appropriately selected according to the size of the optical guide and the impact resistance which it is desired to obtain.

Second Embodiment

Figure 5:
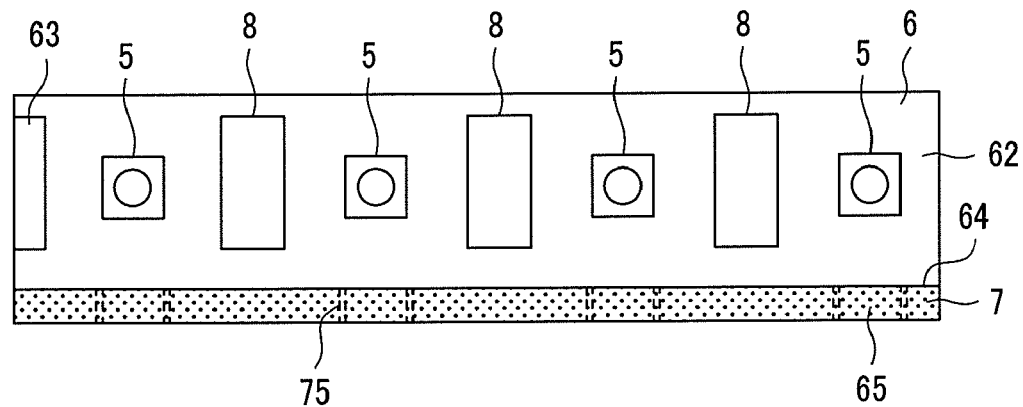
FIG. 5 is a schematic cross-sectional view corresponding to FIG. 3 describing the construction of another embodiment of the backlight used in the liquid crystal display device according to the present invention.
Figure 6:
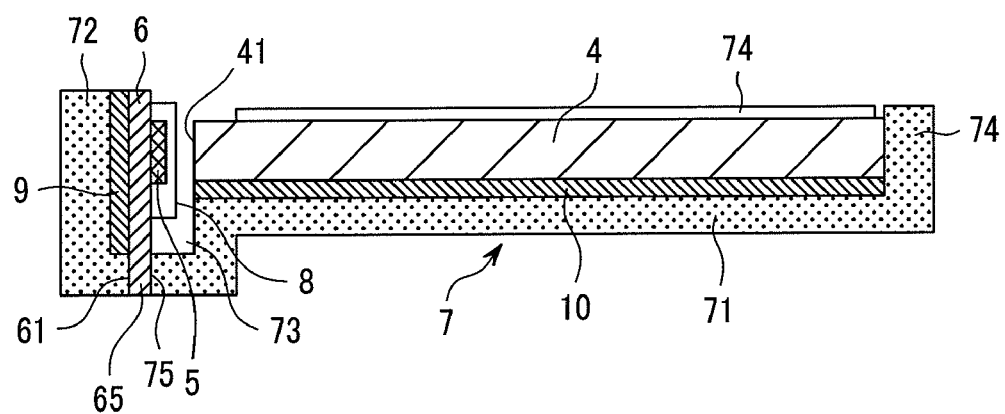
FIG. 6 is a schematic cross-sectional view corresponding to FIG. 4 describing the construction of another embodiment of the backlight used in the liquid crystal display device according to the present invention.

FIG. 5 and FIG. 6 are schematic views showing the construction of a second embodiment of the present invention. FIG. 5 is a cross-sectional view corresponding to FIG. 3, and FIG. 6 is a cross-sectional view corresponding to FIG. 4. Identical parts to those in the drawings for the previous embodiment are assigned identical symbols.

In FIG. 5 and FIG. 6, the circuit board 6 also has plural legs 65 extending substantially parallel to the side wall 72 of the case 7 further down from the lower edge 64. The legs 65 are inserted in holes 75 previously punched in the lower part of the depression 73 of the case 7 to fix their position, the side wall 72 of the case 7 and rear surface 61 are stuck together through the joining member 9, and the relative positional relationship between the optical guide 4 and LED 5 is thereby determined. It will of course be understood that also in the second embodiment, the projecting dimensions of the spacers 8 from the surface 62 of the circuit board 6 of the LED 5 are maintained to correlate exactly with those of the first embodiment. This correlation is identical also in the following embodiments.

In the second embodiment, plural (4) of the legs 65 were disposed, but their positions and numbers may be appropriately selected according to the size of the optical guide and the impact resistance which is desired to obtain. In the construction of the second embodiment, since the circuit board 6 is supported both by the legs 65 and by joining to the rear surface, displacement of the circuit board 6 can be suppressed, the LED can be prevented from coming in contact with the optical guide due to misalignment of the spacers 8, and failure of the LED to light up can thus be prevented.

Third Embodiment

Figure 7:
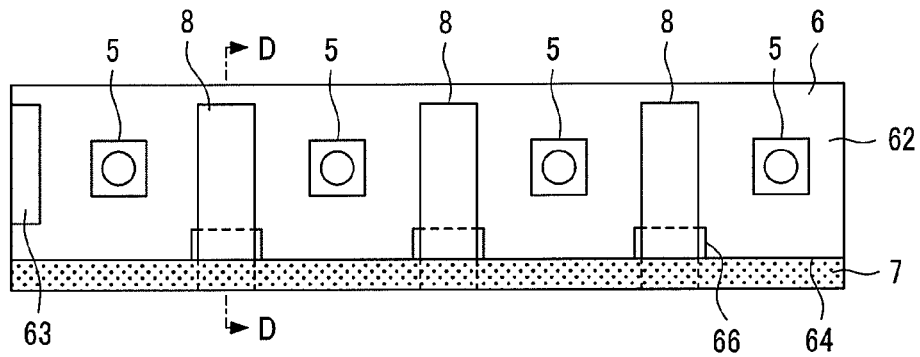
FIG. 7 is a schematic cross-sectional view describing the construction of yet another embodiment of the backlight used in the liquid crystal display device according to the present invention.
Figure 8:
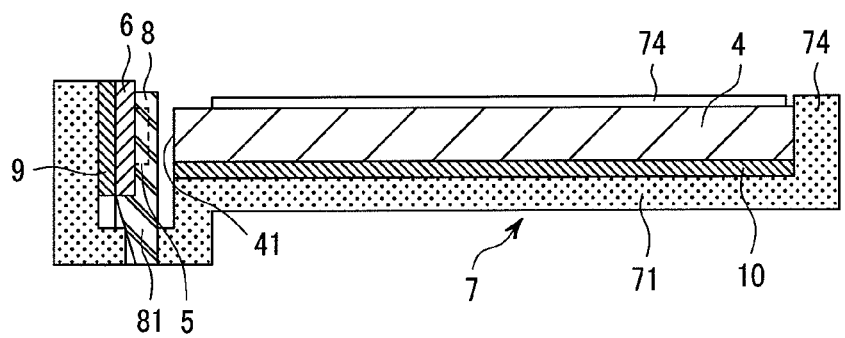
FIG. 8 is a schematic cross-sectional view corresponding to a line C-C in FIG. 3 describing the construction of yet another embodiment of the backlight used in the crystal display device according to the present invention.
Figure 9:
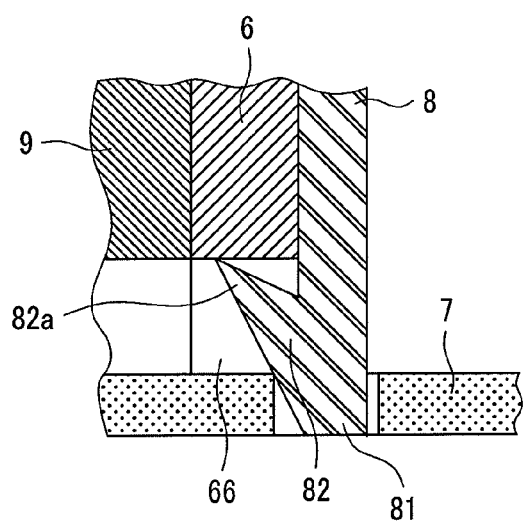
FIG. 9 is a schematic cross-sectional view taken along a line D-D in FIG. 7.

FIG. 7 to FIG. 9 are schematic views describing the construction of a third embodiment of the present invention. FIG. 7 is a cross-sectional view corresponding to FIG. 3, FIG. 8 is a cross-sectional view corresponding to a line C-C in FIG. 2, and FIG. 9 is an enlarged cross-sectional view taken along a line D-D in FIG. 7. In FIG. 7 to FIG. 9, identical parts to those of the diagrams of the embodiments are assigned identical symbols.

In FIG. 7 to FIG. 9, the spacers 8 fixed to the circuit board 6 have projecting parts 81 on their lower ends extending further down below the lower edge 64 of the circuit board 6, part of this projecting part 81 being pressed into the hole 75 in the depression 73 of the case 7. Further, this projecting part 81 has an "inverted needle" 82 projecting on the surface 62 side of the circuit board 6 above the pressed-in part. This inverted needle 82 has a projection 82a extending obliquely upwards towards the side wall 72 side in the upper part, this projection 82a being made to engage with a notch 66 on the lower edge side of the circuit board 6 to support the circuit board 6. Further, the rear surface 61 of the circuit board 6 is joined to the side wall 72 via the joining member 9.

In the third embodiment, plural (3) of the spacers 8 were disposed, but the positions and numbers thereof may be appropriately selected according to the size of the optical guide and the impact resistance it is desired to obtain.

In the construction of the third embodiment, since the circuit board 6 is supported both by the projecting parts 81 and the rear surface joint, displacement of the circuit board 6 can be suppressed, between the LED and optical guide due to misalignment of the spacers 8 can be prevented, and hence failure of the LED to light up can be resolved.

Fourth Embodiment

Figure 10:
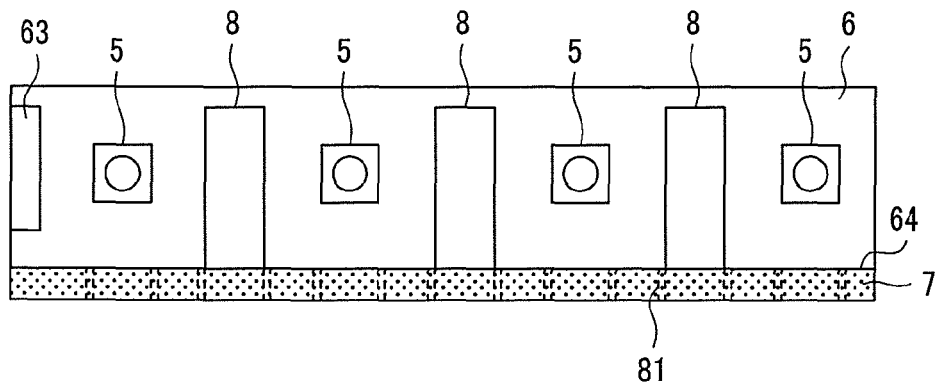
FIG. 10 is a schematic cross-sectional view corresponding to FIG. 3 describing yet another embodiment of the backlight used in the liquid crystal display device according to the present invention.
Figure 11:
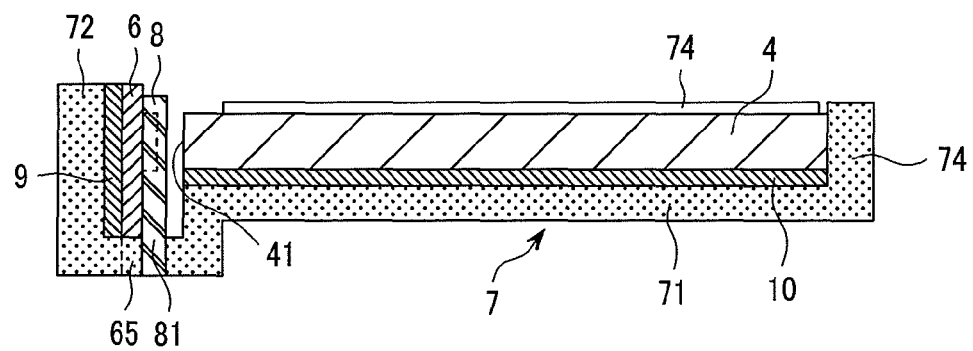
FIG. 11 is a schematic cross-sectional view corresponding to FIG. 8 describing yet another embodiment of the backlight used in the liquid crystal display device according to the present invention.
Figure 12:
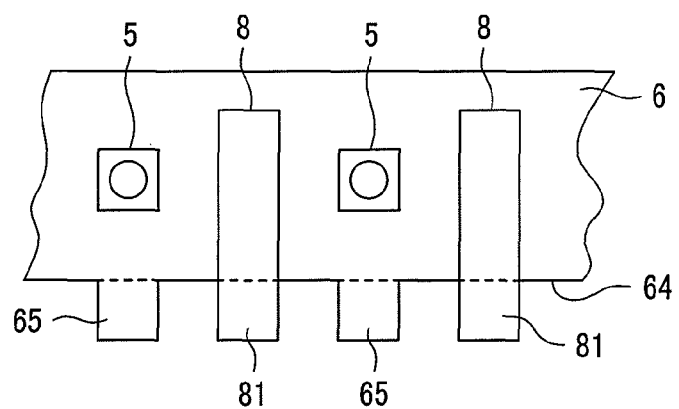
FIG. 12 is a schematic plan view of the essential parts of FIG. 10.

FIG. 10 to FIG. 12 are schematic views describing a fourth embodiment of the present invention. FIG. 10 is a cross-sectional view corresponding to FIG. 3, FIG. 11 is a cross-sectional view corresponding to FIG. 8, and FIG. 12 is a plan view of the essential parts of FIG. 10. In FIG. 10 to FIG. 12 also, identical parts to those in the figures of the embodiments are assigned identical symbols.

In the fourth embodiment shown in FIG. 10 to FIG. 12, in the circuit board 6 and spacers 8, the legs 65 and projections 81 are respectively inserted in the holes 75 of the depression 73 in the case 7, and the rear surface 61 of the circuit board 6 is joined to the side wall 72 via the joining member 9.

In the fourth embodiment, the projections 81 were formed on all of the spacers 8, and the legs 65 were uniformly distributed over the entire length of the circuit board 6, but their positions and numbers may be appropriately selected according to the size of the optical guide and the impact resistance it is desired to obtain.

In the construction of the fourth embodiment, since the circuit board 6 is held at three locations, i.e. by the legs 65, the projections 81 and the rear surface joint, displacement of the circuit board 6 can be suppressed, the LED can be prevented from coming in contact with the optical guide due to misalignment of the spacers 8, and failure of the LED to light up can therefore be resolved.

In the fourth embodiment, the circuit board 6 was supported at three locations, i.e., by the legs 65, the projections 81 and the rear surface joint, but provided that it is supported firmly by the legs 65 and the projections 81, the rear surface joint may be omitted.

Fifth Embodiment

Figure 13:
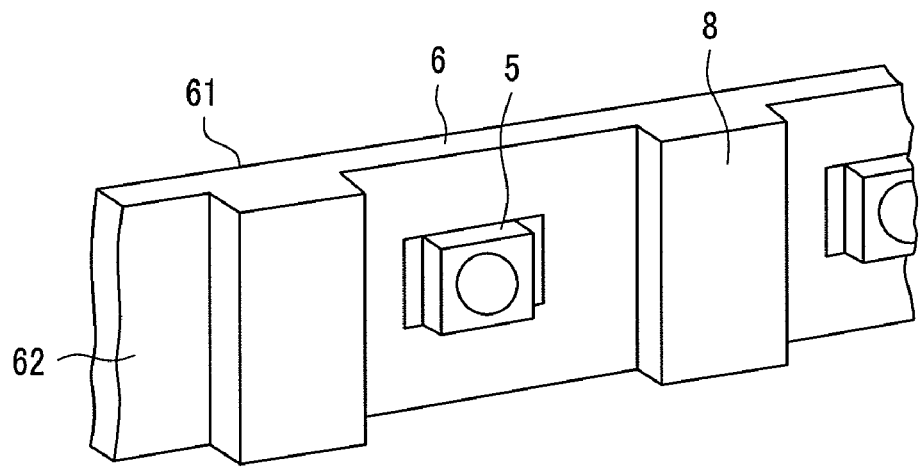
FIG. 13 is a schematic perspective view describing yet another embodiment of the backlight used in the liquid crystal display device according to the present invention.

FIG. 13 is a perspective view of the essential features describing the construction of a fifth embodiment of the present invention. Identical parts to those of the diagrams of the embodiments are assigned identical symbols. In FIG. 13, in the fifth embodiment, the spacers 8 are formed in a one-piece construction with an insulating substrate which is a component part of the circuit board 6, and the spacers 8 are disposed all together on the surface 62 of the circuit board 6. Due to this construction, the circuit board 6 can be fixed to the case 7 by various means, such as joining to the rear surface or insertion in the holes 75 of the depression 73 of the case 7.

In the fifth embodiment, the spacers 8 were disposed on either side of the LED 5, but their positions and numbers may be appropriately selected according to the size of the optical guide and impact resistance it is desired to obtain. In the construction of the fifth embodiment, the positional relationship between the spacers 8 and circuit board 6 can be controlled more precisely. Also, it also has a feature that a step for fixing the spacers 8 is not required.

Sixth Embodiment

Figure 14:
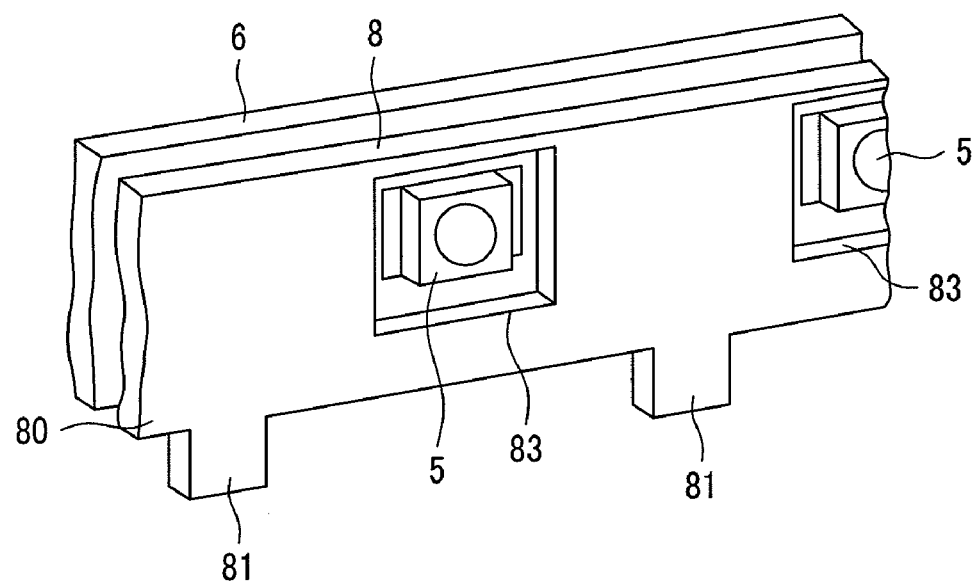
FIG. 14 is a schematic perspective view describing yet another embodiment of the backlight used in the liquid crystal display device according to the present invention.

FIG. 14 is a perspective view of essential parts describing a sixth embodiment of the present invention. Identical parts to those of the previous embodiments are assigned identical symbols. In FIG. 14, in the sixth embodiment, the spacers 8 are formed from one insulating sheet 80, and are inserted in holes 83 at positions respectively facing the LED 5 of the insulating sheet 80, while the plural projections 81 are also disposed in the lower part.

The spacers 8 are disposed between the circuit board 6 and the optical guide 4, and the gaps between the circuit board 6, optical guide 4 and spacers 8 are determined. Specifically, the projections 81 provided below the spacers 8 are inserted in the holes 75 of the depression 73 of the case 7, and after arranging the LED 5 and holes 83 to be coaxial, the case 7 and the spacers 8 are fixed together. Due to this, the LED 5 are prevented from coming in contact with the optical guide 4.

In the sixth embodiment, the holes 83 of the spacers 8 are disposed in pairs with the LED 5, but the holes 83 may also be of such dimensions that several of them are common to plural LED 5, and their positions and numbers may be appropriately selected according to the size of the optical guide and impact resistance it is desired to obtain.

According to the sixth embodiment, since the spacers 8 are provided as independent structures from the circuit board 6 and optical guide 4, they can be prevented from following the displacement of the circuit board 6 or optical guide 4, so the LED 5 can be prevented from coming in contact with the optical guide 4.

Seventh Embodiment

Figure 15:
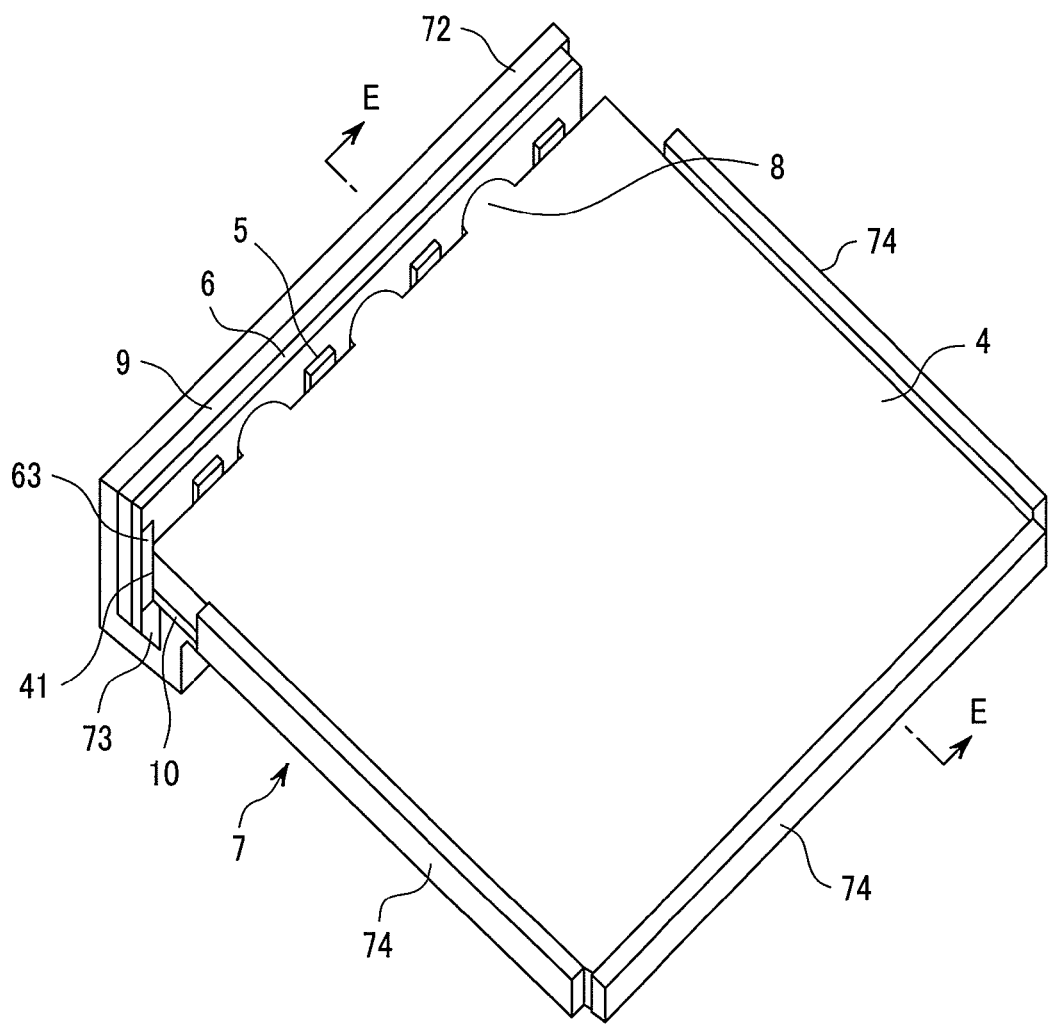
FIG. 15 is a schematic perspective view describing yet another embodiment of the backlight used in the liquid crystal display device according to the present invention.
Figure 16:
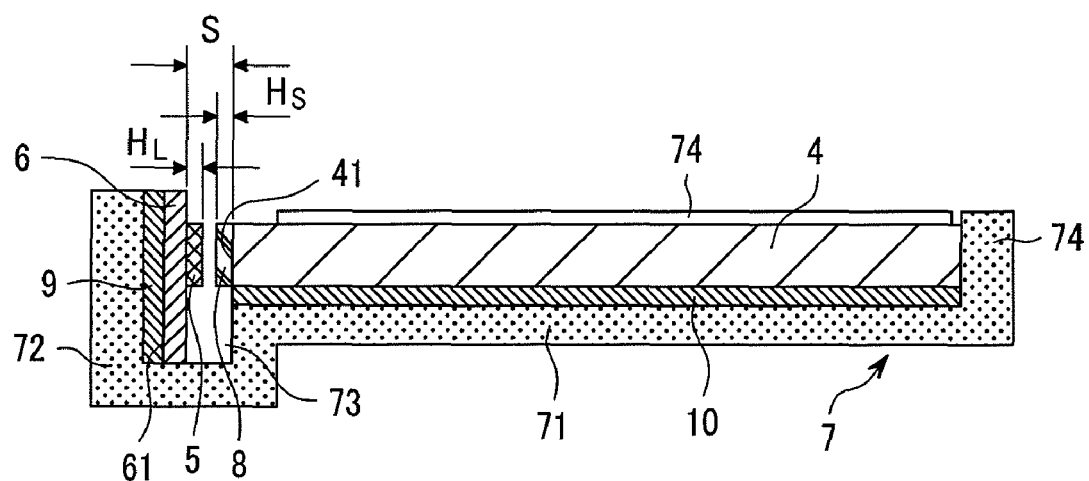
FIG. 16 is a schematic cross-sectional view taken along a line E-E in FIG. 15.

FIG. 15 and FIG. 16 are schematic views showing a seventh embodiment of the present invention. FIG. 15 is a perspective view of essential parts corresponding to FIG. 2, and FIG. 16 is a cross-sectional view taken along a line E-E in FIG. 15. In FIGS. 15 and 16, identical parts to those of the diagrams of the embodiments are assigned identical symbols.

In FIG. 15 and FIG. 16, in the seventh embodiment, the spacers 8 are formed in a one-piece construction together with the optical guide 4. Specifically, on the side wall 41 facing the LED 5 of the optical guide 4, plural spacers 8 are formed projecting toward the LED 5 side from the upper edge face to the lower edge face. The values of the projecting dimensions $H_S$ of the spacers 8 from the side wall 41, the projecting dimensions $H_L$ of the LED 5 from the surface 62 of the circuit board 6, and the dimension S between the side wall 41 and surface 62 of the circuit board 6, are set to be respectively identical to those of the first embodiment shown in FIG. 4.

In the seventh embodiment, the spacers 8 were disposed respectively between the LED 5, but their positions and numbers may be appropriately selected according to the size of the optical guide and impact resistance it is desired to obtain. Also, the length of the spacers 8 may be less than the length of the optical guide 4, or they may be of such dimensions that they extend towards the depression 73 side.

According to the seventh embodiment, the positional relationship between the spacers 8 and the optical guide 4 can be controlled more precisely. Further, a step for fixing the spacers 8 is not necessary.

What is claimed is:

1. A liquid crystal display device, comprising:
  a liquid crystal display panel formed by enclosing a liquid crystal layer between a pair of transparent substrates having a pixel-forming electrode on an inner surface; and
  a backlight for irradiating an illumination light on the liquid crystal display panel,
  wherein the backlight includes:
  a plurality of light-emitting elements;
  a circuit board on which the plurality of light-emitting elements are disposed;
  an optical guide facing the plurality of light-emitting elements, wherein each of the plurality of light-emitting elements is disposed on the circuit board at a predetermined interval from each other;
  wherein the optical guide includes a main surface disposed opposite to liquid crystal display panel and a side surface;
  wherein the plurality of light-emitting elements disposed opposite to the side surface of the optical guide:
  a case for housing the circuit board and the optical guide; and
  a spacer which prevents the optical guide from coming in contact with the plurality of light-emitting elements, said spacer being disposed between the optical guide and the circuit board,
  wherein the spacer is disposed between at least two of the plurality of light-emitting elements;
  wherein the case includes:
  a flat part on which the optical guide is mounted;
  a side wall standing substantially perpendicular to the flat part which supports the circuit board; and
  a depression, which is disposed between this side wall and the flat part, the depression housing the lower part of the circuit board and being set back substantially parallel to the side wall from the edge of the flat part,
  the depression opens up in a direction perpendicular to a direction of the side surface of the optical guide.

2. The liquid crystal display device according to claim 1, wherein the spacer is disposed on the circuit board.

3. The liquid crystal display device according to claim 2, wherein the projecting dimensions of the spacer from the circuit board surface are larger than the projecting dimensions of at least one of the plurality of light-emitting elements from the circuit board surface.

4. The liquid crystal display device according to claim 1, wherein the spacer is a sheet-like body interposed between the circuit board and the optical guide, and the sheet-like body has openings at positions corresponding to at least one of the plurality of the light-emitting elements.

5. The liquid crystal display device according to claim 4, wherein the openings are respectively disposed corresponding to the plurality of light-emitting elements.

6. The liquid crystal display device according to claim 1, wherein the spacer is disposed on the optical guide.

7. The liquid crystal display device according to claim 6, wherein the projecting dimensions of the spacer from the optical guide surface are larger than the projecting dimensions of the light-emitting elements from the circuit board surface.

8. The liquid crystal display device according to claim 1, wherein the circuit board is stuck to the case.

9. The liquid crystal display device according to claim 1, wherein the circuit board has a leg extending substantially parallel to the side wall of the case from its lower edge, this leg being inserted into the opening of the depression in the case and fixed to the case.

10. A liquid crystal display device, comprising:
  a liquid crystal display panel formed by enclosing a liquid crystal layer between a pair of transparent substrates having a pixel-forming electrode on an inner surface; and
  a backlight for irradiating an illumination light on the liquid crystal display panel,
  wherein the backlight includes:
  a plurality of light-emitting elements;
  a circuit board on which the plurality of light-emitting elements are disposed;
  an optical guide facing the plurality of light-emitting elements, wherein each of the plurality of light-emitting elements is disposed on the circuit board at a predetermined interval from each other;
  a case for housing the circuit board and the optical guide; and
  a spacer which prevents the optical guide from coming in contact with the plurality of light-emitting elements, said spacer being disposed between the optical guide and the circuit board,
  wherein the spacer is disposed between at least two of the plurality of light-emitting elements,
  wherein the spacer has a projection extending further downwards from the lower edge position of the circuit board, the projection is being inserted into the opening of the depression in the case and fixed to the case;

wherein the spacer has an inverted needle projecting towards the sidewall of the case in part of the projection, the inverted needle is engaging with a notch in the lower part of the circuit board and fixed to the circuit board;

wherein the case includes:

a flat part on which the optical guide is mounted;

a side wall standing substantially perpendicular to the flat part which supports the circuit board; and a depression which is disposed between this side wall and the flat part, the depression housing the lower part of the circuit board and being set back substantially parallel to the side wall from the edge of the flat part, the depression opens up in a direction perpendicular to a direction of the side surface of the optical guide.

11. The liquid crystal display device according to claim 10, wherein the optical guide includes a main surface disposed opposite to liquid crystal display panel and a side surface.

12. The liquid crystal display device according to claim 11, wherein the plurality of light-emitting elements disposed opposite to the side surface of the optical guide.

* * * * *